United States Patent [19]
Ching, Jr. et al.

[11] 3,789,657
[45] Feb. 5, 1974

[54] GRID FOR STRAIN MEASUREMENTS

[75] Inventors: Larry K. W. Ching, Jr., Littleton; Carl E. Shafter, Englewood, both of Colo.

[73] Assignee: The United States of America as represented by the Secretary of the Army, Washington, D.C.

[22] Filed: Oct. 27, 1971

[21] Appl. No.: 193,125

[52] U.S. Cl. ................................................. 73/88 R
[51] Int. Cl. ............................................. G01b 5/30
[58] Field of Search ....... 73/88 R, 88 A; 356/32, 35

[56] References Cited
UNITED STATES PATENTS
3,552,856 1/1971 Schwallie ...................... 73/88 R X
3,613,679 10/1971 Bijou .............................. 73/88 A X Primary Examiner—Richard C. Queisser
Assistant Examiner—Stephen A. Kreitman
Attorney, Agent, or Firm—Edward J. Kelly; Herbert Berl

[57] ABSTRACT

In stress analysis work a grid system may be affixed to a sheet of metal or other object that undergoes distortion or deformation due to a force being applied thereto. The present grid system of circles and squares (or rectangles) enables easy measurement of maximum and minimum strains and their respective directions and reduces computation time in stress analysis work.

1 Claim, 2 Drawing Figures

PATENTED FEB 5 1974 3,789,657

INVENTORS
LARRY K.W. CHING, Jr.
CARL E. SHAFER

BY Harry M. Saragovitz,
Edward J. Kelly & Herbert Berl
ATTORNEYS

GRID FOR STRAIN MEASUREMENTS

BRIEF SUMMARY

Known grids for strain analysis include the rectangular grid and the polar grid. The rectangular grid simply has parallel straight lines, equally spaced, running along the X-axis and parallel straight lines, equally spaced, running along the Y-axis, (graph paper pattern). Distortion of the grid results in the parallel straight lines being bent in the area where the distortion occurs. By examining and analyzing the bent lines we can determine the magnitude of the stress that occurs and at what area on the grid the stress is located (knowing of course the magnitude or degree of force required to cause distortion of a certain magnitude). However, the measurements and calculations with regard to the bent lines are difficult and tedious.

As to the polar grid the grid lines radiate outwardly from a center point like the spokes of a wheel. The magnitude or degree of stress which causes distortion of these grid lines can be calculated. However, here again the measurements and calculations are complicated and tedious to make.

The present invention substantially reduces the time and effort needed to make the measurements and calculations for determining the location and magnitude of the stresses. A gridding blank has a rectangular grid, or squares, and circles. Each circle has its center located at the intersection of a horizontal line and a vertical line. The blank may be placed at an area where strains occur. The center of a circle and the cross-point of corresponding rectangular grid lines may be at the center of the strained area. The resultant distortion of the gridding blank is easy to read and the degree of stress is easy to calculate as will become obvious from the following detailed description. Also, if the stresses do not cause distortion which is equal in all directions the circle will be stretched to an ellipse which can be easily read and from which calculations can be easily made to determine the non-uniform degree of stress in various directions.

IN THE DRAWING

Figure 1:
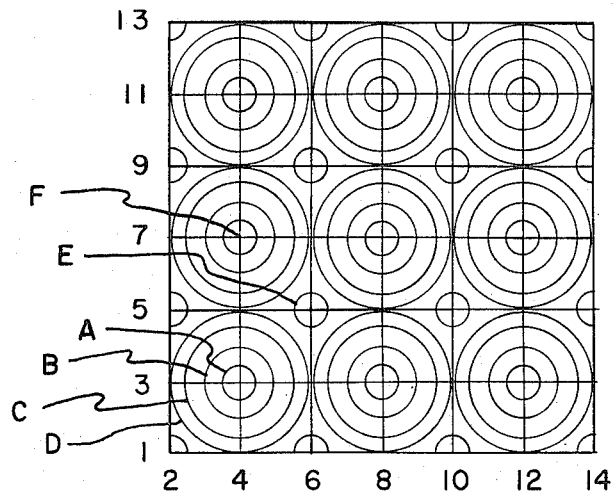
FIG. 1 is a diagram of a gridding blank embodying this invention.

In FIG. 1 the rectangular grid lines that are horizontal are designated 1, 3, 5, 7, 9, 11 and 13. The grid lines that are vertical are designated 2, 4, 6, 8, 10, 12 and 14. A typical circular area with a plurality of concentric rings is designated as A, B, C and D. A typical small single circle is designated as E.

Figure 2:
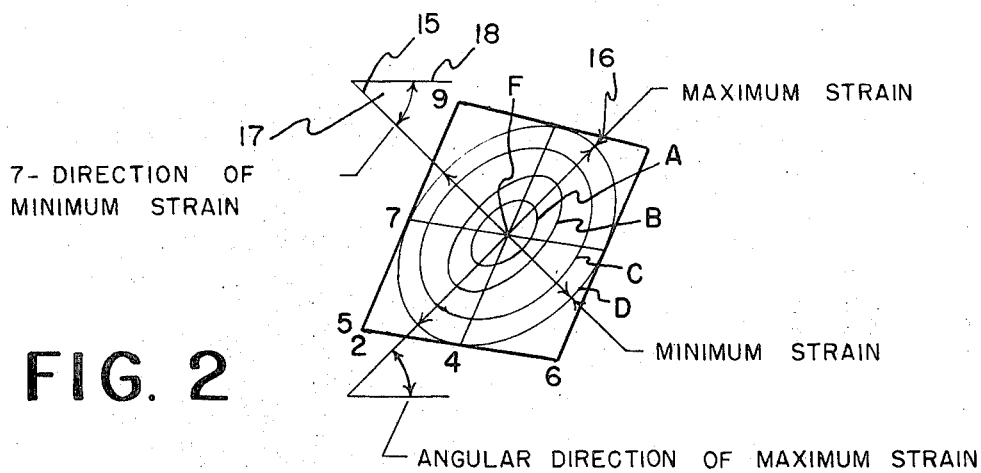
FIG. 2 is a diagram showing the results of unequal stresses distorting one of the circles into an ellipse.

FIG. 2 illustrates an area of the grid under strain that is not perfectly balanced about the reference point designated as F. The unbalanced strains cause the previously circular rings A, B. C and D to be deformed into ellipses. These ellipses have their short axes oriented along the line of minimum strain, designated as 15. Their long axes are oriented along the line of maximum strain, designated as 16. Previously vertical lines 2, 4 and 6 are distorted and now slope upward to the right. Previously horizontal lines 5, 7 and 9 are distorted and now slope downward to the right. The line of minimum strain 15 bears an angle 17 relative to the horizontal 18. The line of maximum strain, at a right angle to the angle of minimum strain, bears an angle relative to the horizontal, and an angle relative to the vertical, each of which can be readily calculated by a mathematician.

USE

From the foregoing it will be seen that the new grid system retains the advantages of the rectangular grid (lines 1–13 and 2–14) and adds advantages of a circular grid which provides several other features. The circles quickly show how far out from the center reference point the strain is. Also the unbalanced strains form the circles into ellipses. The magnitudes of these unbalanced strains are easy to calculate by the mathematician because they are simple geometrical functions of well-known ellipses. The distribution of these unbalanced strains can easily be calculated with relation to the various circles A–D as well as the vertical lines 2–14 and the horizontal lines 1–13. And, the distortion of the vertical and horizontal lines can also be easily measured. Therefore the present grid enables the quick and easy approach to taking data and analyzing such data to determine the characteristics of strains.

The grid may comprise a number of lines on a stretchable blank to be placed over a plate being deformed, or may be a plurality of deformable wires to be pasted to a plate being deformed, or may be a plurality of marks on a plate being deformed, or may be of other construction as will be obvious to those skilled in the art.

We claim:

1. A method of measuring stresses and strains comprising affixing a stretchable sheet to an object undergoing deformation due to forces applied thereto, wherein said sheet contains a pattern of a plurality of intersecting horizontal and vertical equidistant straight lines and a plurality of circles having centers at points of intersection of said lines, said sheet undergoing a deformation corresponding to the strained area of said object, and measuring the strain of said strained area by measuring the deformation of said pattern.

\* \* \* \* \*

UNITED STATES PATENT OFFICE
CERTIFICATE OF CORRECTION

Patent No. 3,789,657  Dated February 5, 1974

Inventor(s) Larry K. W. Ching, Jr., et al.

It is certified that error appears in the above-identified patent and that said Letters Patent are hereby corrected as shown below:

On the Title page"

Item 75   the last name of the second inventor - "Shafter" should read -- Shafer --.

Signed and sealed this 10th day of September 1974.

(SEAL)
Attest:

McCOY M. GIBSON, JR.              C. MARSHALL DANN
Attesting Officer                Commissioner of Patents